Jan. 22, 1957  J. B. CROSETTO, JR., ET AL  2,778,343
SNUBBER FOR DOUBLE-ACTING HYDRAULIC ACTUATORS
Filed Dec. 23, 1953  2 Sheets-Sheet 1
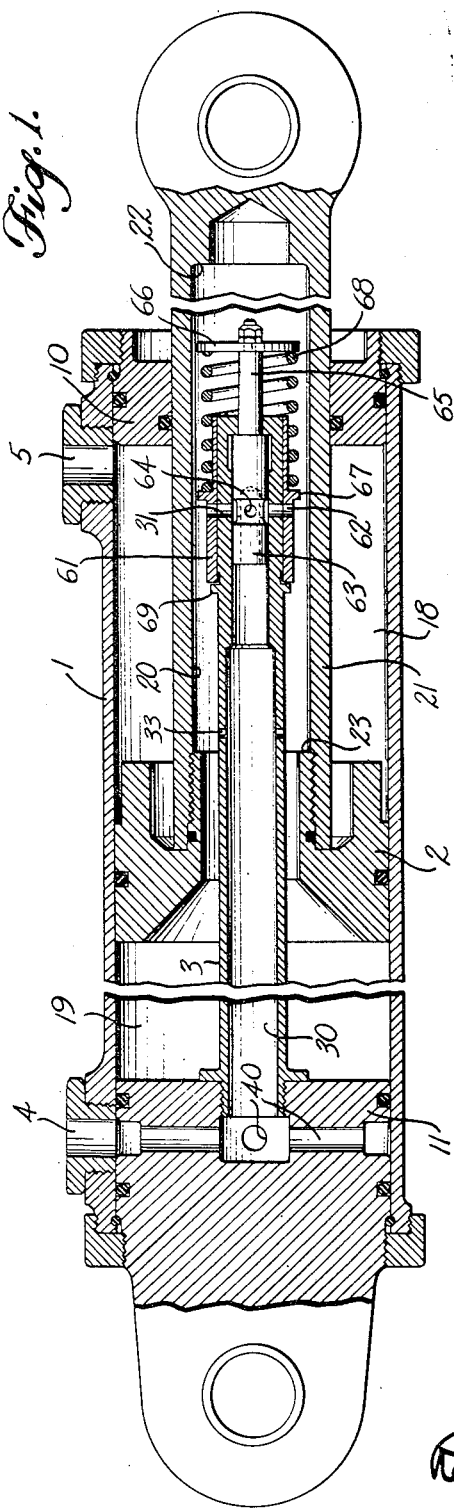
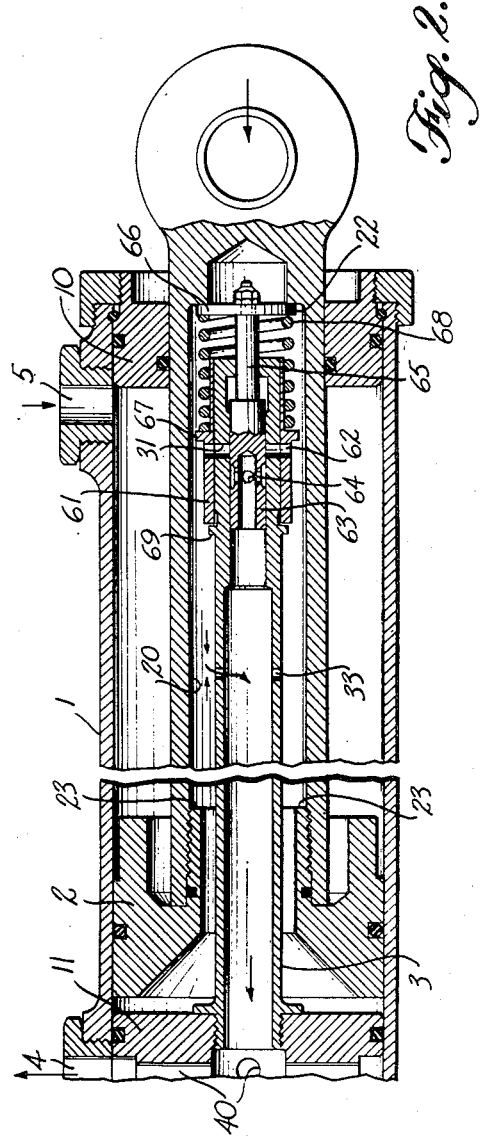
INVENTORS.
JOHN B. CROSETTO JR.
GEORGE C. NEWELL JR.
BY
Reynolds, Beach & Christensen
ATTORNEYS Jan. 22, 1957  J. B. CROSETTO, JR., ET AL  2,778,343
SNUBBER FOR DOUBLE-ACTING HYDRAULIC ACTUATORS
Filed Dec. 23, 1953  2 Sheets-Sheet 2
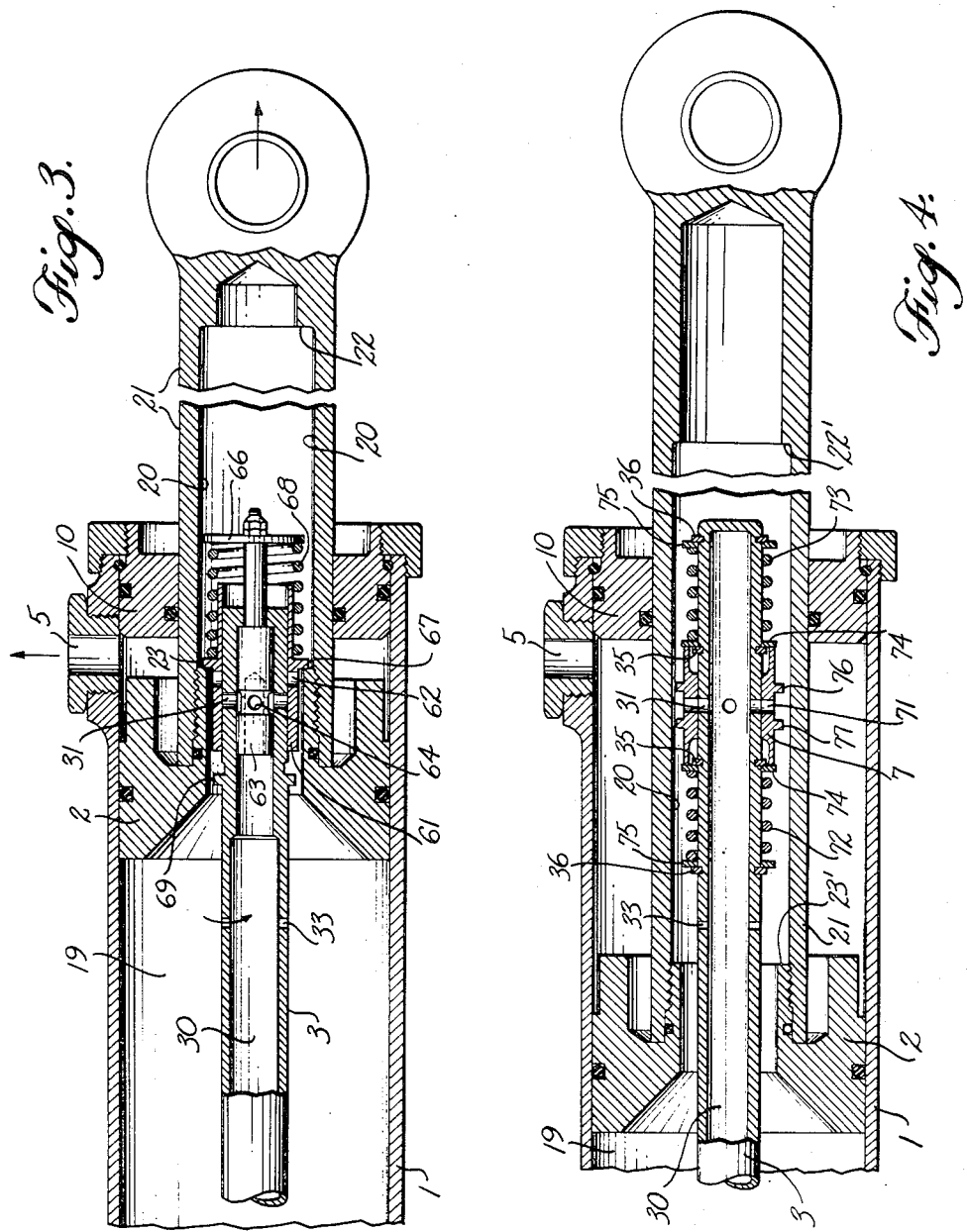
INVENTORS.
JOHN B. CROSETTO JR.
GEORGE C. NEWELL JR.
BY
Reynolds, Beach & Christensen
ATTORNEYS United States Patent Office 2,778,343
Patented Jan. 22, 1957

2,778,343

SNUBBER FOR DOUBLE-ACTING HYDRAULIC ACTUATORS

John B. Crosetto, Jr., Mercer Island, and George C. Newell, Jr., Seattle, Wash., assignors to Boeing Airplane Company, Seattle, Wash., a corporation of Delaware Application December 23, 1953, Serial No. 400,013

6 Claims. (Cl. 121—38)

Hydraulic jacks and similar double-acting hydraulic actuators, such as are used in aircraft for example, to operate flaps, landing gear, etc., have heretofore been provided with snubbing means to slow down their final movement into one or both the limit positions. This invention pertains to such actuators, and to snubbing means for the same, but whereas in previous snubbers, where snubbing is desired at both limits of the movement, two separate valve mechanisms have been employed, to throttle usually outflow from the respective ends of the actuator, according to the present invention a single valve mechanism is employed to throttle appropriately and alternately inflow to and outflow from a single end of the actuator. Moreover, the fluid flow is controlled only through the head end of the cylinder, and not through the opposite or rod end (the end through which the piston rod projects), and thereby the development of dangerously high rod end pressure during snubbing of the projective or "extend" movement is avoided.

In the head end of the cylinder the entire area of the piston is exposed to system pressure, and the total force developed is the product of the system pressure and the piston area. The rod end of the cylinder is of materially reduced area, because of the space occupied by the large piston rod, hence when the full system pressure is exerted on the head end over the entire piston area the total pressure so developed is exerted on the much smaller rod end area, and if the outflow from the latter end is severely throttled, the resultant pressure in the cylinder's rod end becomes dangerously high. Failure of seals or of mechanical parts may result, and it is to avoid the possibility of such failures that, according to the present invention, inflow to the head end is throttled when snubbing "extend" movement, rather than outflow from the rod end, and the same valve mechanism is also employed for throttling outflow from the head end in order to snub "retract" movement.

The primary object of the present invention is seen to relate to the avoidance of excessive pressure within the cylinder due to snubbing, by throttling both inflow to and outflow from the head end of the cylinder. Additionally, it is an object to do so by means of a single double-acting valve mechanism operatively controlling communication between the head end and the pressure fluid source, and shifted appropriately by contact with fixed abutments located adjacent the limits of longitudinal movement of the piston relative to the cylinder.

It is a still further object to provide snubbing mechanism of the nature indicated in which the valve mechanism may be of either of two alternatively usable forms in which one integral or two separate valve elements is or are balanced by resiliently yieldable means in a normal valve-open position of equilibrium, from which the valve elements are shiftable by the engagement of abutments or contact means carried respectively by the valve mechanism and by the piston rod adjacent the ends of its travel, so that as the piston and its rod approach either end of its travel such complemental contact means will engage and will shift the valve mechanism, in opposition to the resiliently yieldable means, into valve-closed position, and this regardless of the sense of movement of the piston and its rod. Thereby inflow from the head end or outflow from the head end is restricted, depending upon the sense of movement of the parts.

The invention is illustrated in each of two alternatively usable forms embodying the principles of the invention as explained above and as will be more fully brought out hereinafter, and as is shown in the accompanying drawings.

Figure 1 is an axial sectional view through such a hydraulic actuator with the snubber device incorporated therein, parts being shown in an intermediate position as they would be during either projection or retraction, with the snubber device in valve-open position.

Figure 2 is a view similar to Figure 1 but showing primarily the rod end, with parts in the position corresponding to approach of the piston to the limit of its retractive movement toward the head end, and with the valve past which the principal flow occurs during the midpart of the movement already shifted to valve-closed position.

Figure 3 is a view similar to Figures 1 and 2 but showing parts approaching the fully extended position and the valve already shifted to valve-closed position.

Figure 4 is a fragmentary view corresponding to Figure 1 but showing a modified form of the valve mechanism.

The actuator may control, for example, the extension and retraction of a landing gear. It includes the cylinder 1 with its head 11 at the one end and the piston 2 slidable within the cylinder and having a piston rod 21 which projects through the rod-end closure 10. The piston rod is of large diameter, and hollow, having the bore 20, and the piston also is bored so that the interior of the bore 20 will communicate with the cylinder space 19 at the head end, but will not communicate with the rod-end cylinder space 18 at the opposite side of the piston. Movement of the piston in the "extend" or the "retract" sense is controlled by a control valve, not shown, connecting to ports 4 and 5, and determining through which thereof the system pressure is admitted, and which is vented.

A hollow stem 3 is mounted in and projects from the head 11 into the bore 20 of the piston rod to a point adjacent the closure 10 at the opposite end of the cylinder. This stem is ported at this opposite end, as indicated at 31, for substantially unrestricted passage of fluid from within the hollow 30 of the stem into the bore 20 of the piston rod and into the cylinder space 19 of the head end, or for discharge of fluid by a like path. A first fluid port 4 connects with the head end of the cylinder and thence by suitable passages 40 to the interior 30 of the stem. A similar port 5 communicates with the rod end cylinder space 18. During extension or projection of the piston rod the first fluid port 4 is a pressure port, and fluid under pressure is admitted by the path already described into the head end cylinder space 19, and fluid escapes from the rod end cylinder space 18 by way of the second fluid port 5. During retraction the situation is reversed, and pressure fluid is admitted by way of the port 5 into the cylinder space 18 and fluid escapes from the cylinder space 19 by way of the port 31 and out at the first fluid port 4. Such admission and discharge is accomplished so long as the port 31 remains fully open, and while it is fully open the passage of fluid through it is substantially unrestricted. This condition prevails during all movement of the actuator except the last part thereof, in each sense of its movement.

Valve means are provided for restricting or cutting off flow through the port 31. In the form shown in Figures 1, 2 and 3, two valve elements constitute parts of the valve means, being an external sleeve 61, having the port 62 which cooperates with the port 31, and an internal plug or sleeve 63 having the port 64 which also cooperates with the port 31. The internal valve element 63 has a stem 65 which projects outwardly through the closed end of the hollow stem 3 and which carries at its outer end a flange 66. The sleeve 61 is formed with an outwardly directed flange 67, and a compression spring 68 between the flanges 67 and 66 urges the two cooperating valve elements 61 and 63 in respectively opposite senses. A stop shoulder 69 on the stem engages the end of the exterior sleeve 61 to limit this movement under the influence of the spring to a position wherein the ports 62 and 31 are in registry, and in similar fashion the end of the internal valve element 63 seats against the end of the hollow stem 3 as a stop in a position such that its port 64 lies in registry with the port 31.

The positions described are the normal valve-open positions of equilibrium, and the parts occupy such positions so long as the actuator is in a position either not fully retracted or not fully extended. However, if it be assumed that parts are approaching the fully retracted position, as in Figure 2, at which time pressure fluid is entering by way of the port 5 and fluid is escaping by way of the port 4, as this limit of movement is approached the flange 66 engages a contact shoulder 22 projecting inwardly from the bore 20 of the piston rod 21, and this engagement during retractive movement shifts the internal valve element 63 inwardly of the bore 30 of the hollow stem 3 until, as seen in Figure 2, the port 64 no longer registers with the port 31. When this occurs, the free passage of fluid through the port 31 is cut off. It is preferred that there be one or more bleed ports 33 through the wall of the hollow stem 3, outside the influence of the valve mechanism, to afford continuing but restricted communication between the bore 30 and the bore 20, and so between the port 4 and the head end cylinder space 19. Continued but restricted flow through the bleed port 33, when the valve element 63 is shifted into nonregistering or valve-closed position, will permit continued approach of the piston 2 to the head 11, but will slow down that approach and bring it gently to an end. Flow in the reverse sense will be initiated through the bleed port 33, until the ports have moved longitudinally sufficiently to bring ports 64 and 31 again into registry.

Figure 3 illustrates the opposite condition, as parts approach the fully extended position of the piston rod. As this fully extended position is approached, a shoulder 23 on the interior of the bore 20 and adjacent or carried by the head 2, engages the outwardly projecting flange 67 of the sleeve 61, and shifts this sleeve in opposition to the compression spring 68 until its port 62 no longer registers with the port 31. The effect is the same as before, namely that free passage of fluid through the port 31 from the port 4 into the cylinder space 19 is cut off, and such further passage of fluid into the cylinder space 19 as may be desired takes place through the bleed port 33.

It will be observed that all restriction, whether of inflow or of outflow, occurs at the end of the stem 3 and at a point intermediate the head end of the cylinder 1 and any cylinder space, but always in a passage that communicates with the head's port 4, and not at all in communication with the port 5. There is no sudden build-up of pressure on the cylinder's rod end 10, nor within the smaller rod-end space 18, for the pressure is controlled at the stem, and within the larger head-end space 19, and through the port 4 alone.

In Figure 4 the valve device is shown in a modified form, and all other parts are substantially the same and hence need no further description. In this form the valve element constitutes a single sleeve 7 having a port 71 which cooperates with the port 31 of the stem, this sleeve 7 being mounted exteriorly of the stem for sliding lengthwise of the latter. It is held in valve-open position of equilibrium between two compression springs 72 and 73, each of which is supported between two collars, an interior collar 74 and an exterior collar 75, each of which is slidable upon the stem 3, but the sliding whereof is limited by stops 35 and 36, respectively, which are fixed to the stem. The valve sleeve 7 may slide past the interior stops 35 sufficiently to move its port 71 out of registry, in either axial sense, with the port 31. It is caused so to move by engagement of its respective outwardly projecting abutments or flanges 76 and 77 with the respective shoulders 22' and 23' within the bore 20 of the piston rod. These stop shoulders 22' and 23', respectively, are located sufficiently inwardly of the respective ends of the bore 20 that they may contact the flanges or abutments 76 and 77 before the piston rod reaches the end of its travel, and its end, for instance, engages the end of the stem 3.

We claim as our invention:

1. In combination with a cylinder headed at one end, and having a closure of smaller area at its opposite end, a piston reciprocably slidable within said cylinder and having a rod projecting through and slidably packed within said closure, the piston dividing the cylinder space into a head end space and a rod end space, a head end port and a rod end port for admission of pressure fluid to the respective spaces and for venting of fluid from the other such space, to effect reciprocation of the piston in one sense or the other, a passage intermediate the head end port and the head end space including a valve port of a size to permit substantially unrestricted inflow to and outflow from the head end space, valve means cooperating with said valve port to throttle both inflow to the head end space and outflow from the same, resilient means urging the valve means into valve-open position, and contact means including elements positioned adjacent the opposite limit positions of the piston and piston rod, and complemental elements operatively connected to the valve means, interengageable as the piston approaches either limit position to shift the valve means in opposition to said resilient means into throttling position.

2. The combination of claim 1, including also a bleed port of a size and located to afford restricted communication at all times through said passage between the head end port and the head end space.

3. In combination with a cylinder headed at one end, a piston reciprocably slidable within said cylinder, a piston rod projecting from the piston through the cylinder's end which is opposite its head end, and formed hollow for free communication with the space at the head end, only; a first and a second fluid ports at its head end and at its opposite end, respectively, for admittance to and discharge from the cylinder space at the respectively opposite sides of the piston, a hollow stem projecting from the cylinder's head into and spaced from the hollow piston rod, the interior of said stem communicating with the first of said fluid ports, and said stem having a port at its end which is distant from the cylinder head for normal free entrance of fluid from the first fluid port into the hollow piston rod and so to the one side of the piston, to extend the piston rod, or alternatively for discharge of fluid by the same path upon admission of fluid by way of the second fluid port to effect retraction of the piston rod, valve means mounted for sliding lengthwise of the stem, and cooperating with its port, cooperating yieldable means and stop means reacting between the stem and said valve means to hold the latter in an intermediate valve-open position, but for sliding movement in either sense to valve-closed position, complemental contact means carried by the valve means and by the piston rod, in position to engage and to shift the valve means to closed position as the piston approaches each limit of its movement, and a bleed port through said stem, in position and of a size to continue restricted communication at all times between the interiors of the stem and of the piston rod, for restricted flow of fluid regardless of the position of the valve means.

4. The combination of claim 3, wherein the valve means comprises a ported and outwardly flanged valve element mounted externally of the stem, and a ported valve element mounted internally of the stem, and projecting from and outwardly flanged beyond the end of the stem, and wherein the yieldable means and stop means include a compression spring intermediate the flanges of the internal and external valve elements and stop shoulders on the stem to maintain their ports, under the influence of said spring, normally in registry with the stem's port, and wherein the complemental contact means include shoulders on the piston rod, adjacent the ends of its travel as related to said flanges of the two valve elements, to contact one or the other such flange and so to shift the corresponding valve element to valve-closed position as the piston and piston rod approach the respective limits of movement lengthwise of the cylinder.

5. The combination of claim 3, wherein the valve means comprises a ported sleeve slidably mounted externally of the stem, and wherein the yieldable means and stop means include two compression springs, one at each end of said sleeve, shoulders carried by the stem and slidable collars engaging each end of each spring and urged by their respective springs against said shoulders, the two inner collars also engaging said sleeve to maintain the latter normally in a valve-open position of equilibrium, and wherein shoulders on the sleeve and shoulders at opposite ends of the travel of the stem are positioned to engage and to shift the sleeve into valve-closed position as the piston and its rod approach the respective limits of movement lengthwise of the cylinder, and so constitute the complemental contact means.

6. In combination with a cylinder headed at one end, a piston reciprocably slidable within said cylinder, a piston rod projecting from the piston through the cylinder's end which is opposite its head end, and axially bored for free communication with the cylinder space at the head end, only; a hollow stem projecting from the cylinder's head into but spaced from the rod's bore, and ported at its ends distant from the cylinder's head, a first fluid port at the head and communicating with the interior of said stem and thence by way of the stem's port and the bore of the piston rod with the head end cylinder space, for admission of fluid to and discharge of fluid from that space, a second fluid port communicating with the rod end cylinder space, for admission of fluid to and discharge of fluid from that latter space, in alternation with the first fluid port, valve means carried by said stem and cooperating with its port, resiliently yieldable means operatively reacting between said valve means and the stem to maintain the valve means normally in valve-open position, complemental contact means carried by said valve means and spaced apart on said piston rod for engagement as the piston and its rod approach either end of their movement within the cylinder, to shift the valve means in opposition to the yieldable means towards valve-closed position, and a bleed port through the stem, and located to remain open notwithstanding closure of said valve means, for restricted flow of fluid at all times into or from the interior of said stem.

References Cited in the file of this patent
UNITED STATES PATENTS

| | | |
|---|---|---|
| 635,848 | Dutton | Oct. 31, 1899 |
| 917,642 | McElroy | Apr. 6, 1909 |
| 1,132,203 | Matthews | Mar. 16, 1915 |